United States Patent
Takagi

(10) Patent No.: US 8,205,939 B2
(45) Date of Patent: Jun. 26, 2012

(54) HEAT RADIATION MECHANISM

(75) Inventor: Masaru Takagi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 35 days.

(21) Appl. No.: 12/301,318

(22) PCT Filed: Dec. 18, 2007

(86) PCT No.: PCT/IB2007/004000
§ 371 (c)(1),
(2), (4) Date: Nov. 18, 2008

(87) PCT Pub. No.: WO2008/081263
PCT Pub. Date: Jul. 10, 2008

(65) Prior Publication Data
US 2009/0256403 A1    Oct. 15, 2009

(30) Foreign Application Priority Data
Dec. 21, 2006 (JP) .................................. 2006-345068

(51) Int. Cl.
*A47C 7/72* (2006.01)

(52) U.S. Cl. .................................. 297/180.12; 297/180.1

(58) Field of Classification Search ............... 297/180.1, 297/180.12
See application file for complete search history.

(56) References Cited

U.S. PATENT DOCUMENTS

| | | | |
|---|---|---|---|
| 5,505,257 A * | 4/1996 | Goetz, Jr. ..................... 165/183 |
| 5,948,297 A * | 9/1999 | Haubner et al. ............. 219/202 |
| 6,662,891 B2 | 12/2003 | Misu et al. |
| 6,786,541 B2 * | 9/2004 | Haupt et al. ............... 297/180.1 |
| 7,079,379 B2 * | 7/2006 | Yamaguchi et al. .......... 361/676 |
| 7,240,962 B2 * | 7/2007 | Kim ....................... 297/180.12 |
| 7,424,926 B2 * | 9/2008 | Tsuchiya ................... 180/68.5 |
| 2001/0030069 A1 | 10/2001 | Misu et al. |
| 2004/0016580 A1 * | 1/2004 | Kronner et al. ............. 180/68.5 |
| 2004/0062955 A1 * | 4/2004 | Kubota et al. ..................... 429/9 |
| 2005/0111167 A1 | 5/2005 | Yamaguchi et al. |
| 2007/0063551 A1 * | 3/2007 | Gasic et al. ............... 297/180.1 |
| 2007/0128507 A1 * | 6/2007 | Watanabe et al. ............. 429/100 |

FOREIGN PATENT DOCUMENTS

| | | |
|---|---|---|
| CN | 1742396 A | 3/2006 |
| DE | 103 28 582 A1 | 1/2004 |
| FR | 2 735 076 A | 12/1996 |

(Continued)

OTHER PUBLICATIONS

Office Action issued May 24, 2011 in related Chinese Application No. 200780022991.1 and English translation thereof.

(Continued)

*Primary Examiner* — David Dunn
*Assistant Examiner* — Erika Garrett
(74) *Attorney, Agent, or Firm* — Kenyon & Kenyon LLP

(57) ABSTRACT

A heat radiation mechanism that radiates heat from an electrical storage device disposed in a space under a seat installed in the passenger compartment, having a guide surface for directing the heat from the electrical storage device out of the space. The guide surface is inclined with respect to a vertical direction of the seat, and an end of the guide surface farthest from the electrical storage device in the vertical direction of the member is located in the vicinity of an outer face of the seat.

11 Claims, 12 Drawing Sheets

FOREIGN PATENT DOCUMENTS

| | | |
|---|---|---|
| JP | 62-15078 U | 1/1987 |
| JP | 03-21324 Y | 5/1991 |
| JP | 05-24621 Y | 6/1993 |
| JP | 2001-354039 A | 12/2001 |
| JP | 2003-170748 A | 6/2003 |
| JP | 2003-182377 A | 7/2003 |
| JP | 2004-026008 A | 1/2004 |
| JP | 2004-345451 A | 12/2004 |
| WO | WO 2005/051697 A | 6/2005 |

OTHER PUBLICATIONS

Office Action issued Sep. 14, 2011 in related German Application No. 11 2007 002 651.0 and English translation thereof.

In: Wikipedia, Die freie Encyklopaedie, Bearbeitungsstand: Sep. 15, 2011, URL:/http://de.wikipedia,org/wiki/W%C3%Waermestrahlung; pp. 1-5.

\* cited by examiner

HEAT RADIATION MECHANISM

This is a 371 national phase application of PCT/IB2007/004000 filed 18 Dec. 2007, claiming priority to Japanese Patent Application No. 2006-345068 filed 21 Dec. 2006, the contents of which are incorporated herein by reference.

BACKGROUND OF THE INVENTION

1. Field of the Invention

The invention relates to a heat radiation mechanism that efficiently radiates radiating heat generated by an electrical storage device.

2. Description of the Related Art

Electrical storage devices such as secondary batteries and electrical double layer capacitors are used as batteries for hybrid vehicles and electrical vehicles. There are hybrid vehicles in which an electrical storage device is disposed under a seat in the passenger compartment as described in Japanese Patent Application Publication No. 2001-354039 (JP-A-2001-354039, FIGS. 5, 9 etc.) and Japanese Patent Application Publication No. 2003-182377 (JP-A-2003-182377).

More specifically, a battery pack 200 containing a battery module (not shown) is disposed in the space under a seat 100 on the floor 300 of the passenger compartment as shown in FIG. 10. The bottom face 100a of the seat 100 (facing the battery pack 200) is recessed.

In the vehicles described in Japanese Patent Application Publication No. 2001-354039 (JP-A-2001-354039, FIGS. 5, 9 etc.) and Japanese Patent Application Publication No. 2003-182377 (JP-A-2003-182377), a battery case is disposed under the seat and a blower fan is driven to direct the air from the passenger compartment to the battery case.

However, the configuration shown in FIG. 10 has the following problems.

The battery module in the battery pack 200 may generate heat during charge and discharge. The heat generated in the battery module is transferred upward from the battery pack 200.

As a result, because the bottom face 100a of the seat 100 is recessed, the heat from the battery pack 200 accumulates at the bottom face 100a. When the heat from the battery pack 200 accumulates as described above, the thermal radiation efficiency of the battery pack 200 (battery module) decreases.

In the configuration described in JP-A-2001-354039 and JP-A-2003-182377, the fan is forcibly driven to supply air to the battery case. That is, the heat from the battery case cannot be radiated through natural convection of air in the passenger compartment.

SUMMARY OF THE INVENTION

The invention provides a heat radiation mechanism that improves the thermal radiation efficiency of an electrical storage device by natural convection of air in the passenger compartment.

An aspect of the invention relates to a heat radiation mechanism used to radiate heat from an electrical storage device disposed in a space under a member mounted in a passenger compartment of a vehicle, including: a guide portion having a guide surface, which directs the heat from the electrical storage device out of the space, located between the member and the electrical storage device. The guide surface faces the electrical storage device and is inclined with respect to a horizontal direction, and the part of the guide surface that is farthest from the electrical storage device in the vertical direction of the member is located in the vicinity of an outer face of the member.

In the above aspect, the member may be a seat base.

In the above aspect, the guide surface may be inclined toward at least one of the front and rear of the seat base. Furthermore, the guide surface may be inclined toward at least one of the right and left sides of the seat base. In the above aspect, the guide surface may be formed in the shape of a cone or polygonal pyramid.

In the above aspect, the guide surface may be formed of at least one of a flat surface and a curved surface. The curved surface may be convex at least one of upward and downward with respect to the vertical direction of the seat.

In the above aspect, the guide surface 11 may be formed on the entire bottom face of the seat or a part of the seat.

In the above aspect, the guide portion may include a fin arranged along the path through which the heat is transferred on the guide surface.

In the above aspect, a surface of the guide portion near the electrical storage device may include a heat-insulating layer. Alternatively, the guide surface may be made of a material having a high heat absorbing capacity.

In the above aspect, the guide portion may be formed integrally with or separately from the seat.

According to the above aspect, the heat from the electrical storage device is easily directed out of the space under the seat by the guide surface. Therefore, the thermal radiation efficiency of the electrical storage device is improved even in a configuration in which the air in the passenger compartment is circulated through natural convection.

BRIEF DESCRIPTION OF THE DRAWINGS

The foregoing and further, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
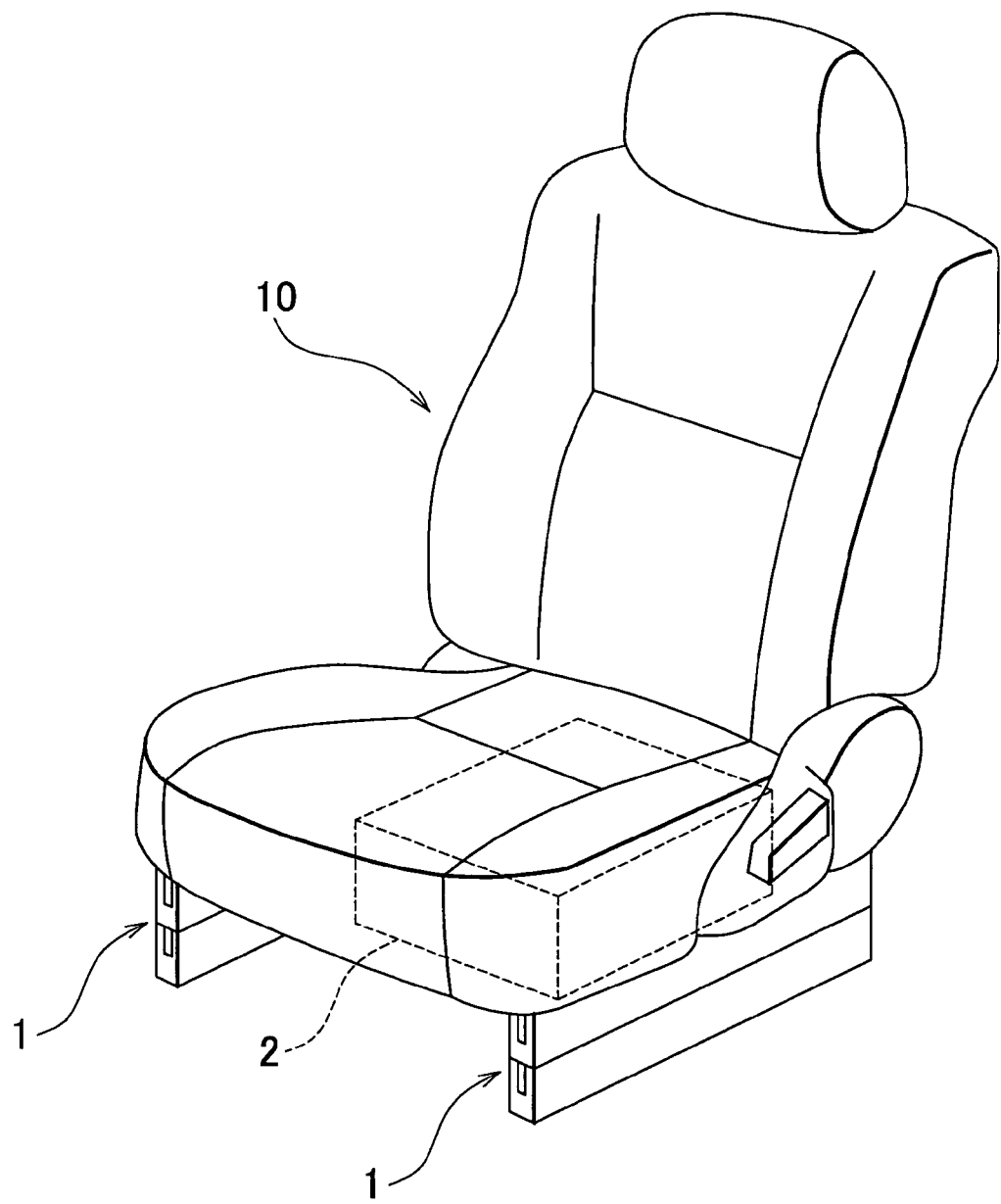
FIG. 1 is an exterior perspective view illustrating the configuration of a seat for use in a heat radiation mechanism of the invention.
Figure 2:
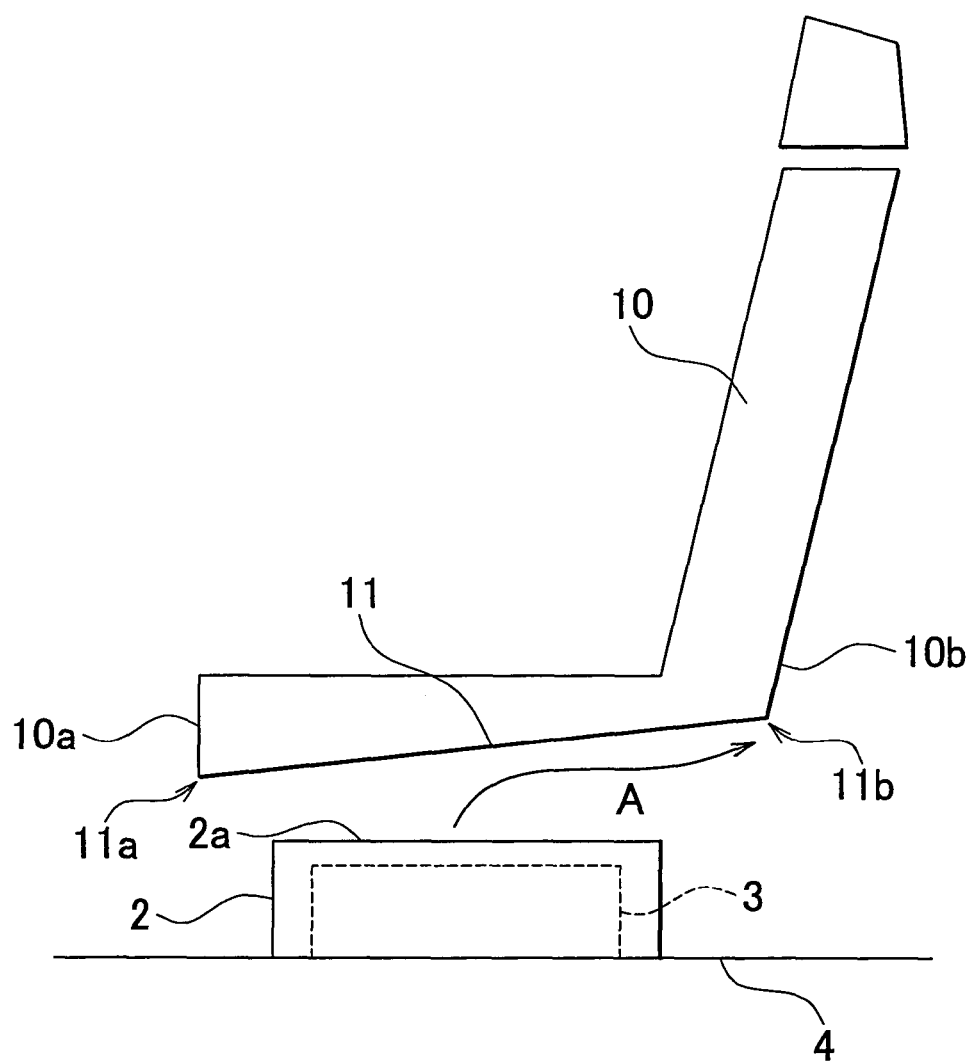
FIG. 2 is a schematic view that depicts a heat radiation mechanism according to a first embodiment of the invention.

A heat radiation mechanism according to a first embodiment of the invention is described with reference to FIG. 1 and FIG. 2. FIG. 1 is an external perspective view of a seat located above an electrical storage device, such as a battery pack, and FIG. 2 is a schematic view that depicts a heat radiation mechanism for a battery pack located under a seat. The heat radiation mechanism of this embodiment may be provided located in a passenger compartment.

The heat radiation mechanism invention includes a seat having a guide surface as described in the following embodiments.

As shown in FIG. 1 and FIG. 2, a battery pack 2 containing a battery module 3 is located under a seat 10. The battery pack 2 is located on the floor 4 of the vehicle body in the passenger compartment. The battery pack 2 containing the battery module 3 may correspond to the electrical storage device of the invention. The passenger compartment is the space in which the seat 10 is placed.

The battery module 3 is composed of a plurality of unit cells (secondary batteries) electrically connected in series. The battery module 3 supplies electric power to electronic devices such as a motor mounted on the vehicle and stores regenerative energy obtained when the vehicle is decelerated and the like.

Although secondary batteries are used as the battery module 3 in the embodiments and modifications described below, the invention is not limited thereto. An electrical double layer capacitor as an electrical storage device may be also used.

The seat 10 is disposed at a prescribed distance from the battery pack 2. The distance may be set as appropriate. Slide mechanisms 1 for supporting the seat 10 for back and forth sliding movement are disposed on both sides of the battery pack 2 as shown in FIG. 1.

As shown in FIG. 2, a guide surface 11 forming the bottom face of the seat 10 is formed of a generally flat surface. The guide surface 11 is formed such that the distance from an upper surface 2a of the battery pack 2 gradually increases from the front end 11a of the guide surface 11 to the rear end 11b of the guide surface 11. In other words, the guide surface 11 is inclined, so that the guide surface 11 somewhat faces the rear of the seat 10 (right-hand side of FIG. 2). That is, the guide surface 11 is inclined with respect to the upper surface 2a of the battery pack 2 or the vertical direction of the seat 10.

The end 11a of the guide surface 11 contacts the front face (outer face) 10a of a member forming the seating face of the seat 10. In other words, the end 11a is located in the plane of the front face 10a. The end 11b of the guide surface 11 is in contact with a rear face (outer face) 10b of a member forming the backrest of the seat 10. In other words, the end 11b is located in the plane of the rear face 10b.

The battery module 3 in the battery pack 2 may generate heat during charge and discharge. In this case, the heat generated in the battery module 3 is radiated outside the battery pack 2 through the battery pack 2.

In the configuration of the heat radiation mechanism of this embodiment, the guide surface 11 is provided on a face of the seat 10 facing the battery pack 2, and therefore, the heat from the battery pack 2 is transferred along the guide surface 11.

Because the guide surface 11 is inclined with respect to the upper surface 2a of the battery pack 2 as described above, the heat from the battery pack 2 tends to be transferred to the rear side of the seat 10 along the guide surface 11 as indicated by an arrow A of FIG. 2. That is, the heat from the battery pack 2, which has a temperature higher than the air in the passenger compartment, is transferred upward of the vehicle.

At this time, because the guide surface 11 is inclined, so that the guide surface 11 somewhat faces the rear of the seat 10, the heat from the battery pack 2 is transferred along the guide surface 11 by natural convection. Then, the heat from the battery pack 2 is transferred out of the space between the guide surface 11 and the battery pack 2.

Therefore, because the heat from the battery pack 2 is released from the space between the guide surface 11 and the battery pack 2 to prevent the heat from accumulating in the space under the seat 10, the thermal radiation efficiency of the battery pack 2 is improved.

Figure 3:
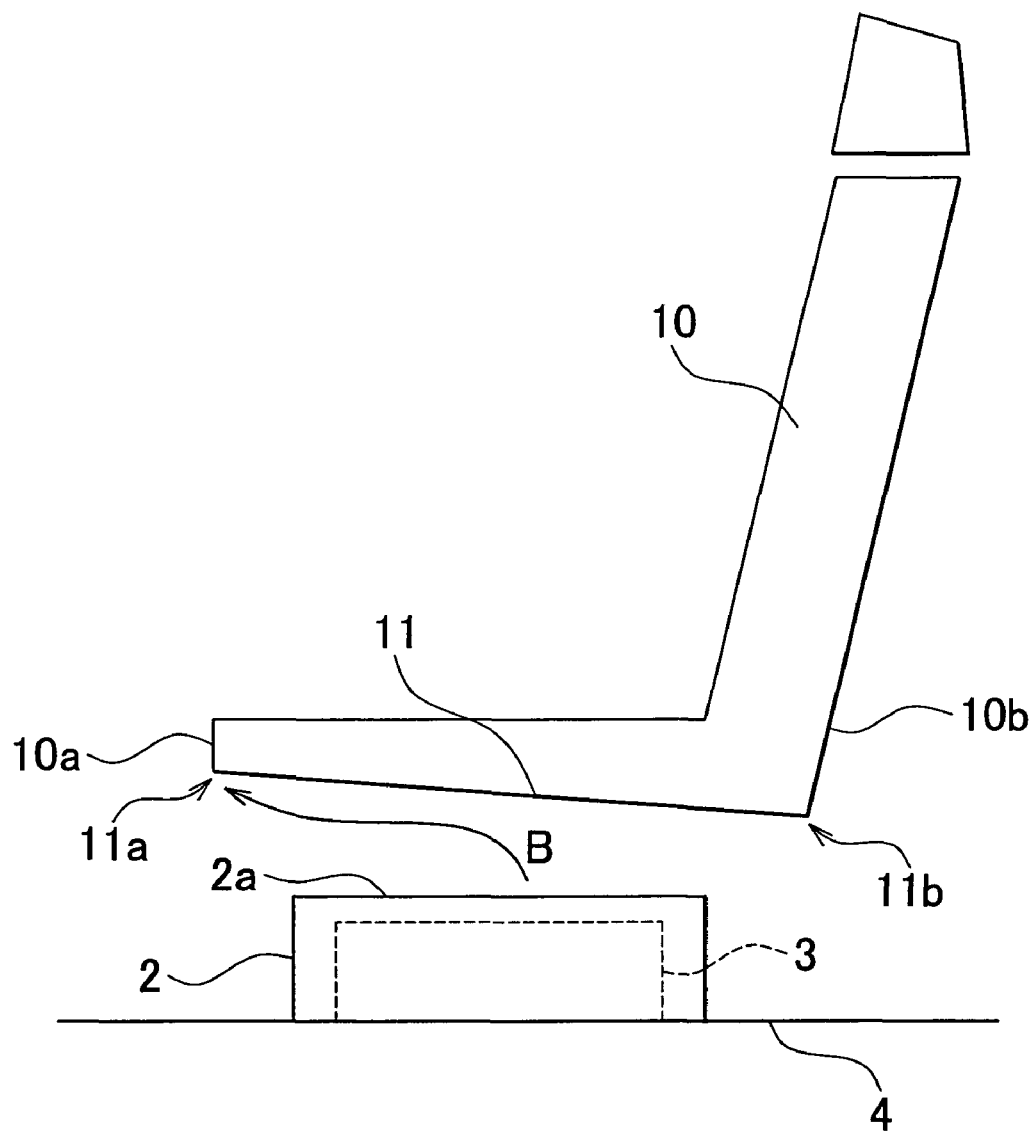
FIG. 3 is a schematic view that depicts a first modification of the heat radiation mechanism according to the first embodiment.

A first modification of this embodiment is next described with reference to FIG. 3. FIG. 3 is a schematic view illustrating a heat radiation mechanism of this modification and corresponding to FIG. 2 of the embodiment described above. Members having the same function as the members described with reference to FIG. 1 and FIG. 2 are designated by the same reference numerals and symbols.

The differences from the embodiment of FIG. 2 described above are mainly described as follows.

As shown in FIG. 3, a guide surface 11 forming the bottom face of the seat 10 is formed of a generally flat surface. The guide surface 11 is formed such that the distance from the upper surface 2a of the battery pack 2 gradually increases from the rear end 11b of the guide surface 11 to the front end 11a of the guide surface 11. In other words, the guide surface 11 is inclined, so that the guide surface 11 somewhat faces the front of the seat 10. That is, the guide surface 11 is inclined with respect to the upper surface 2a of the battery pack 2 or the vertical direction of the seat 10.

In the configuration of this modification, the heat from the battery pack 2 after reaching the guide surface 11 mainly transferred along the guide surface 11 to a space in front of the seat 10. That is, because the heat from the battery pack 2 tends to be transferred upward of the vehicle as described before, when the guide surface 11 is inclined in accordance with the direction of flow of the heat, the heat from the battery pack 2 may be efficiently released from the space under the seat 10 as indicated by an arrow B of FIG. 3.

Figure 4:
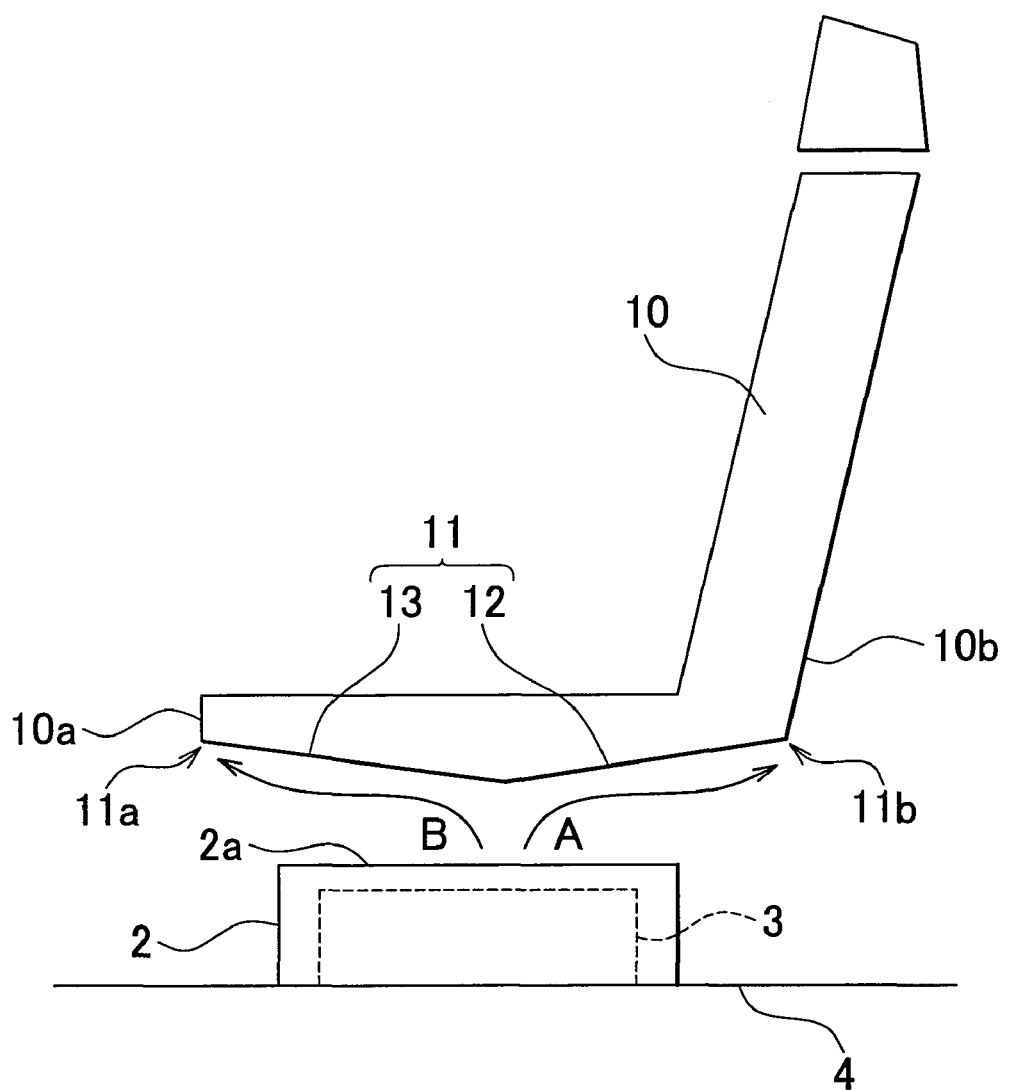
FIG. 4 is a schematic view that depicts a second modification of the heat radiation mechanism according to the first embodiment.

A second modification of this embodiment is next described with reference to FIG. 4. FIG. 4 is a schematic view illustrating a heat radiation mechanism of this modification and corresponding to FIG. 2 of the embodiment described above. Members having the same function as the members described with reference to FIG. 1 and FIG. 2 are designated by the same reference numerals and symbols.

The differences from the embodiment of FIG. 2 described above are mainly described as follows.

The guide surface 11 forming the bottom face of the seat 10 is formed of two generally flat surfaces (first and second guide surfaces 12 and 13).

The first guide surface 12 is formed such that the distance from the upper surface 2a of the battery pack 2 gradually decreases from the rear end 11b of the guide surface 11 to the front end 11a of the guide surface 11 as in the embodiment described before. In other words, the first guide surface 12 is inclined, so that the first guide surface 12 somewhat faces the rear of the seat 10. That is, the first guide surface 12 is inclined with respect to the upper surface 2a of the battery pack 2 or the vertical direction of the seat 10.

The second guide surface 13 is formed such that the distance from the upper surface 2a of the battery pack 2 gradually decreases from the front end 11a of the guide surface 11 to the rear end 11b of the guide surface 11 as in the first modification. In other words, the second guide surface 13 is inclined, so that the second guide surface 13 somewhat faces the front of the seat 10. That is, the second guide surface 13 is inclined with respect to the upper surface 2a of the battery pack 2 or the vertical direction of the seat 10.

The guide surface 11 is closest to the battery pack 2 (upper surface 2a) at the joint between the first and second guide surfaces 12 and 13. The joint between the first and second guide surfaces 12 and 13, which is separated from the upper surface 2a of the battery pack 2 in this modification, may be in contact with the upper surface 2a of the battery pack 2.

According to this modification, the heat from the battery pack 2 is transferred along the first and second guide surfaces 12 and 13 to spaces in front of and behind the seat 10. Therefore, the heat from the battery pack 2 is prevented from accumulating in the space under the seat 10, and the thermal radiation efficiency of the battery pack 2 is improved.

Although the guide surface 11 is formed on the entire bottom face of the seat 10 is described in the embodiment and modifications described above, the invention is not limited thereto.

For example, the guide surface may be formed on at least a part of the bottom face of the seat 10 to direct the heat from the battery pack 2 to at least one of the spaces in front of and behind the seat 10.

More specifically, when the battery pack 2 is located on the front part in the space under the seat 10, the guide surface may be formed on only the front portion of the bottom face of the seat 10. Then, the rear portion of the bottom face of the seat 10 may be formed of a surface generally parallel to the upper surface 2a of the battery pack 2.

Figure 5A:
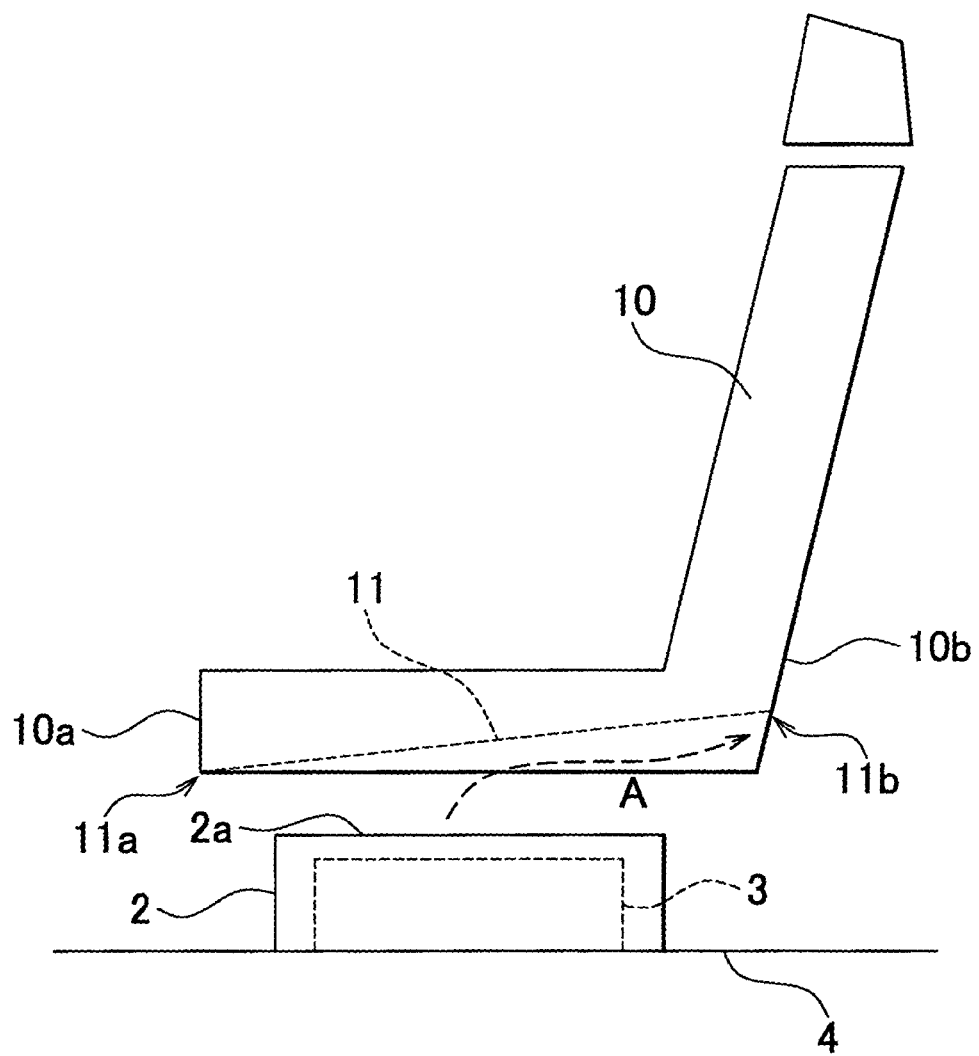
FIG. 5A and FIG. 5B are schematic views that depict further modifications of a heat radiation mechanism according to the first embodiment.
Figure 5B:
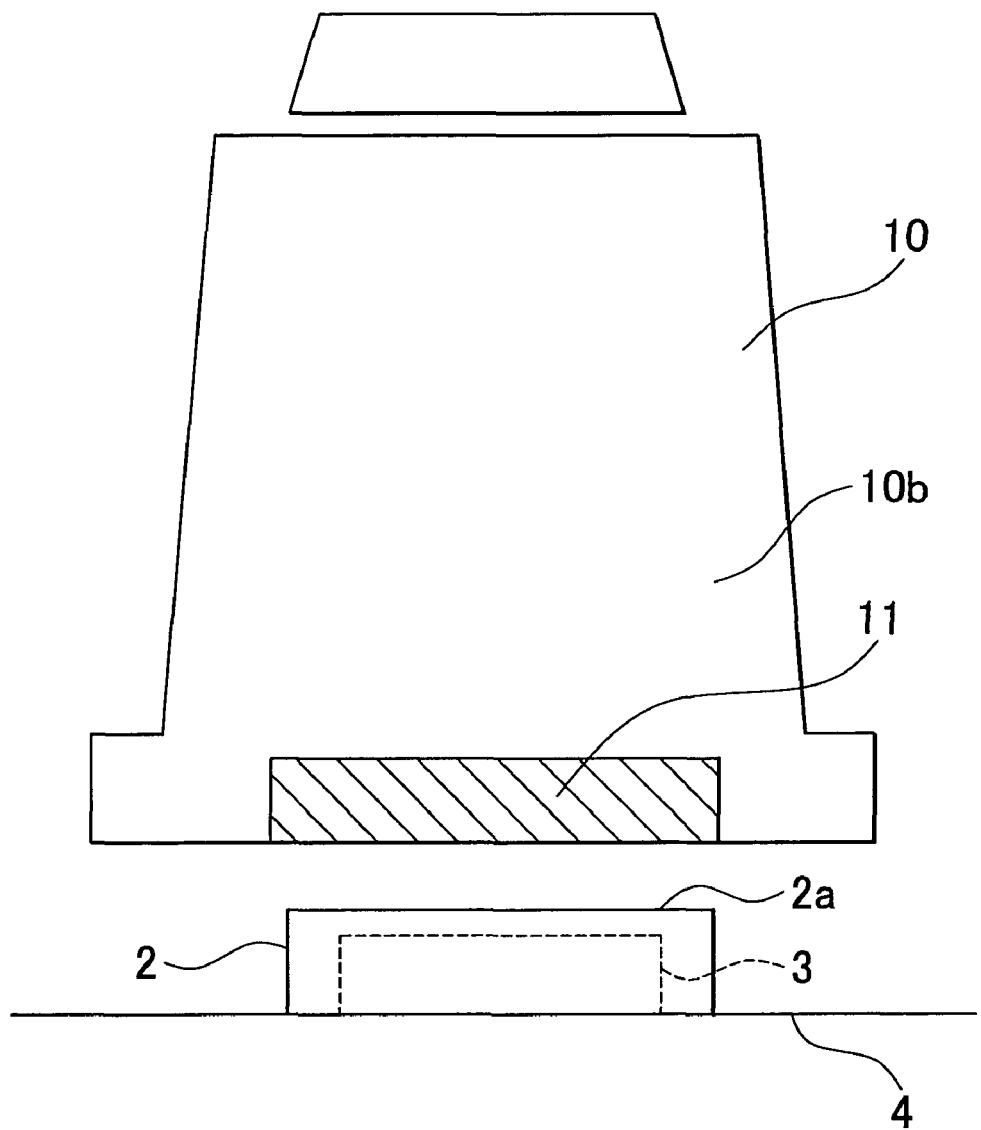

The guide surface 11 may be provided on a part of the bottom face of the seat 10 as shown in FIG. 5A and FIG. 5B. Here, FIG. 5A is a schematic view of the seat 10 seen from one side, and FIG. 5B is a schematic view of the seat 10 seen from the rear.

In the configuration shown in FIGS. 5A and 5B, the center part of the bottom face of the seat 10 in the transverse direction thereof (the direction perpendicular to the plane of FIG. 5A) is recessed and the guide surface 11 is formed in the recess. The guide surface 11, which has a configuration similar to that of the guide surface 11 shown in FIG. 2, is inclined with respect to the vertical direction of the seat 10 so that the guide surface 11 somewhat faces the rear of the seat 10. The guide surface 11 may be formed as shown in FIG. 3 or FIG. 4 instead of as shown in FIG. 2.

While the guide surface 11 is formed of at least one flat surface in the embodiment and modifications described above, the invention is not limited to flat guide surfaces.

Figure 2A:
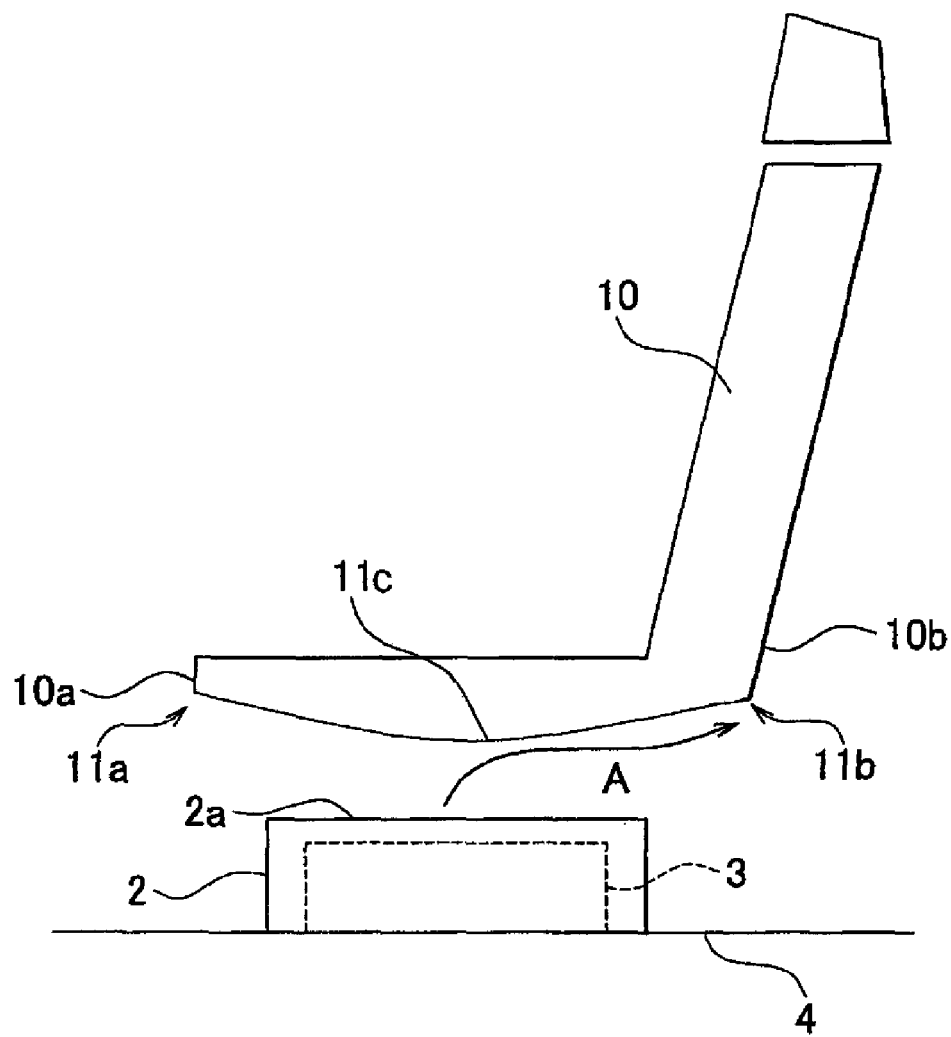
FIG. 2A is a schematic view that depicts a heat radiation mechanism according to an embodiment with a convex curved surface.

For example, the guide surface 44 may be formed of at least one curved surface. More specifically, in the configuration shown in FIG. 2A, the guide surface may be formed of a curved surface 11c convex toward the battery pack 2. The curved surface 11c has a curvature in the longitudinal direction of the seat (horizontal direction of FIG. 2A) but not in the transverse direction of the seat (the direction perpendicular to the plane of FIG. 2A).

Similarly, the guide surface 11 may be formed of a curved surface or surfaces convex toward the battery pack 2 in the configuration shown in FIG. 3 or FIG. 4.

The guide surface 11 may be formed of at least one curved surface concave with respect to the battery pack 2. Because the heat from the battery pack 2 cannot be directed forward or backward from under the seat 10 efficiently when the guide surface 11 is formed of a curved surface or surfaces concave with respect to the battery pack 2 with a too large curvature, the curvature must be set properly so that the heat is radiated from the space under the seat 10 efficiently.

The guide surface 11 may be formed by a combination of a curved surface and a flat surface. Also in this case, it is necessary that the heat from the battery pack 2 is directed to at least one of the spaces in front of and behind the seat 10.

Figure 6:
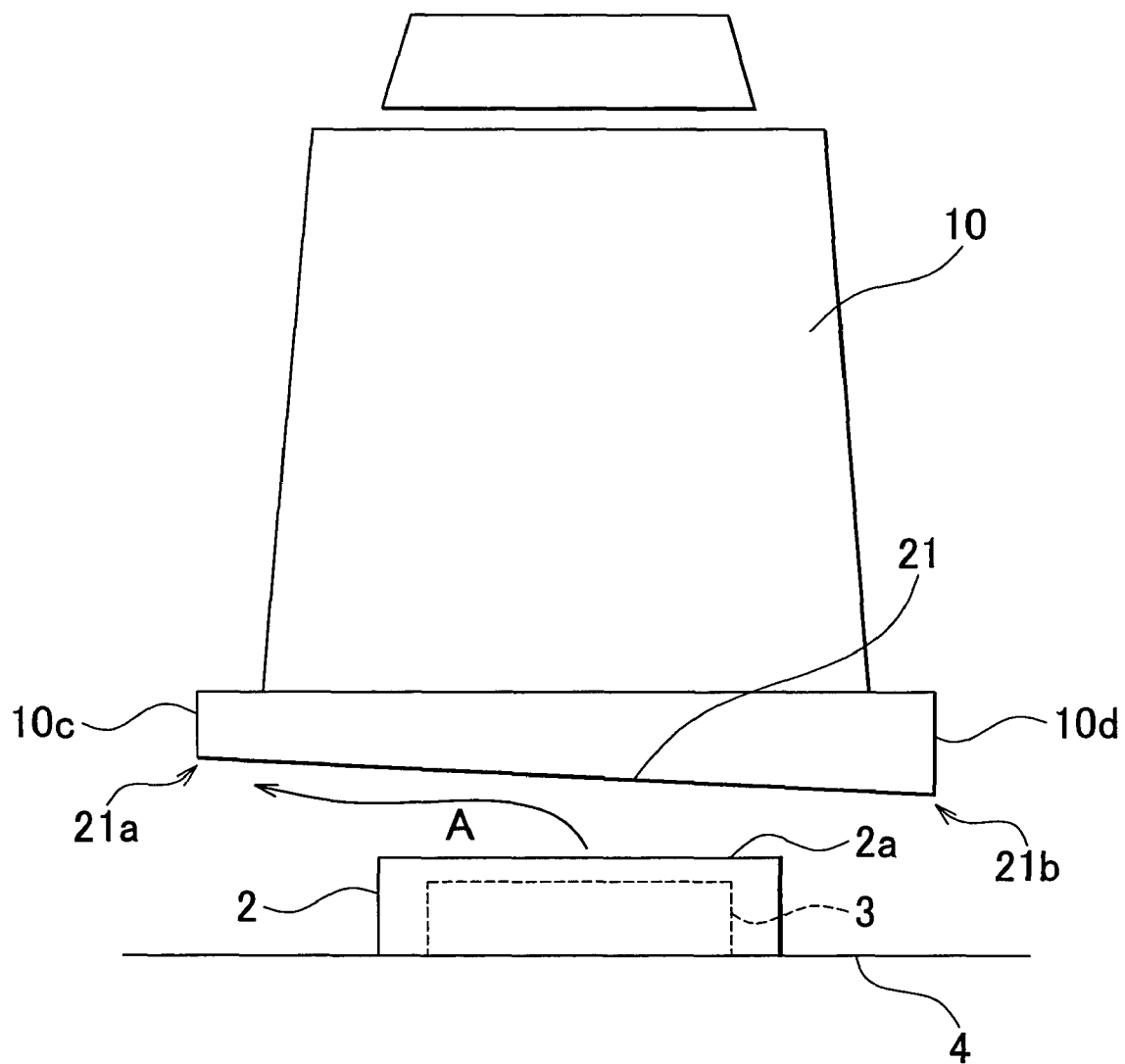
FIG. 6 is a schematic view that depicts a heat radiation mechanism according to the second embodiment of the invention.

A heat radiation mechanism as a second embodiment of the invention is next described with reference to FIG. 6. FIG. 6 is a schematic view of the heat radiation mechanism seen from front side of the seat. The same members as those described in the first embodiment are designated by the same reference numerals and symbols.

Although the heat radiation mechanisms described in the first embodiment and its modifications direct the heat from the battery pack 2 to at least one of the spaces in front of and behind the seat 10, the heat radiation mechanism of this embodiment directs the heat from the battery pack 2 to spaces on the right or left sides of the seat 10. The right and left in this specification are the directions as seen from the front side of the seat 10.

A guide surface 21 forming the bottom face of the seat 10 is formed of a generally flat surface. The guide surface 21 is formed such that the distance from the upper surface 2a of the battery pack 2 gradually decreases from a left end 21a of the guide surface 21 to a right end 21b of the guide surface 21 as seen from front side of the seat 10. In other words, the guide surface 21 is inclined, so that the guide surface 21 somewhat faces the left of the seat 10. That is, the guide surface 21 is inclined with respect to the upper surface 2a of the battery pack 2 or the vertical direction of the seat 10.

The end 21a of the guide surface 21 is in contact with a left face (outer face) 10c of a member forming the seating face of the seat 10. In other words, the end 21a is located in the plane of the left face 10c. The end 21b of the guide surface 21 is in contact with a right face (outer face) 10d of a member forming the seating face of the seat 10. In other words, the end 21b is located in the plane of the right face 10d.

In the configuration of the heat radiation mechanism of this embodiment, because the guide surface 21 is provided on a face of the seat 10 facing the battery pack 2, the heat from the battery pack 2 is transferred along the guide surface 21.

Because the guide surface 21 is inclined with respect to the upper surface 2a of the battery pack 2 as described above, the heat from the battery pack 2 tends to be transferred to the space on the left side of the seat 10 through the guide surface 21. That is, the heat from the battery pack 2, which has a temperature higher than the air in the passenger compartment, is transferred upward of the vehicle. At this time, because the guide surface 21 is inclined, so that the guide surface somewhat faces the left of the seat 10, the heat from the battery pack 2 is transferred along the guide surface 21 by natural convection as indicated by an arrow A of FIG. 6.

Therefore, because the heat from the battery pack 2 is released from the space under the seat 10 to prevent the heat from accumulating under the seat 10, the thermal radiation efficiency of the battery pack 2 is improved.

Figure 7:
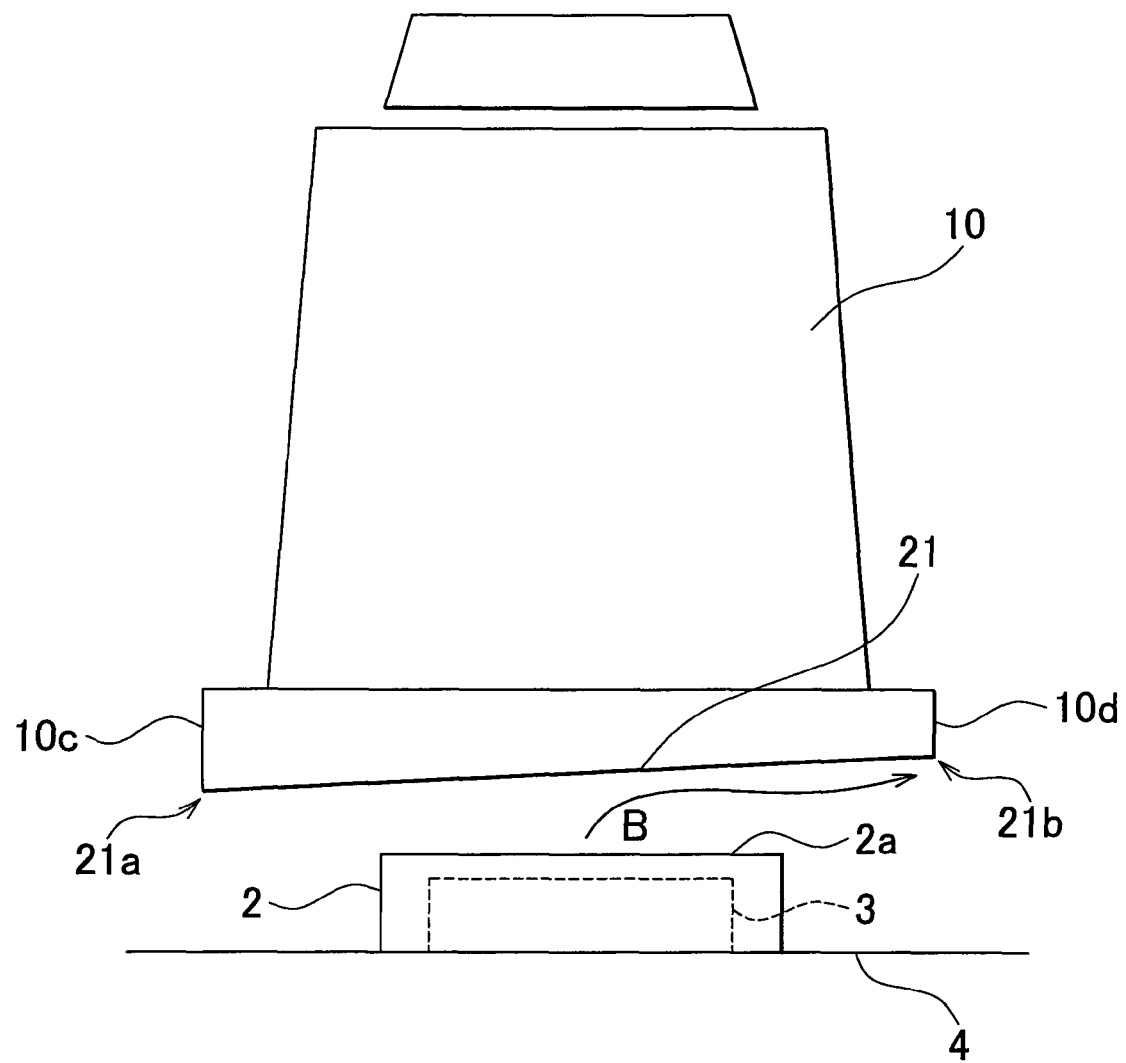
FIG. 7 is a schematic view that depicts a first modification of the heat radiation mechanism according to the second embodiment.

A first modification of this embodiment is next described with reference to FIG. 7. FIG. 7 is a schematic view illustrating a heat radiation mechanism of this modification and corresponding to FIG. 6 of the embodiment described above. Members having the same function as the members described with reference to FIG. 1 and FIG. 6 are designated by the same reference numerals and symbols.

The differences from the embodiment of FIG. 6 described above are mainly described as follows.

A guide surface 21 forming the bottom face of the seat 10 is formed of a generally flat surface. The guide surface 21 is formed such that the distance between the guide surface 21 and the upper surface 2a of the battery pack 2 gradually increases from the left end 21a of the guide surface 21 to the right end 21b of the guide surface 21 as seen from front side of the seat 10. In other words, the guide surface 21 is inclined, so that the guide surface 21 somewhat faces the right of the seat 10. That is, the guide surface 21 is inclined with respect to the upper surface 2a of the battery pack 2 or the vertical direction of the seat 10.

In the configuration of this modification, the heat from the battery pack 2 after reaching the guide surface 21 mainly transferred along the guide surface 21 to a space on the right side of the seat 10. That is, since the heat from the battery pack 2 tends to be transferred upward of the vehicle as described before, when the guide surface 21 is inclined in accordance with the direction of flow of the heat, the heat from the battery pack 2 may be efficiently released from the space under the seat 10 as indicated by an arrow B of FIG. 7.

Figure 8:
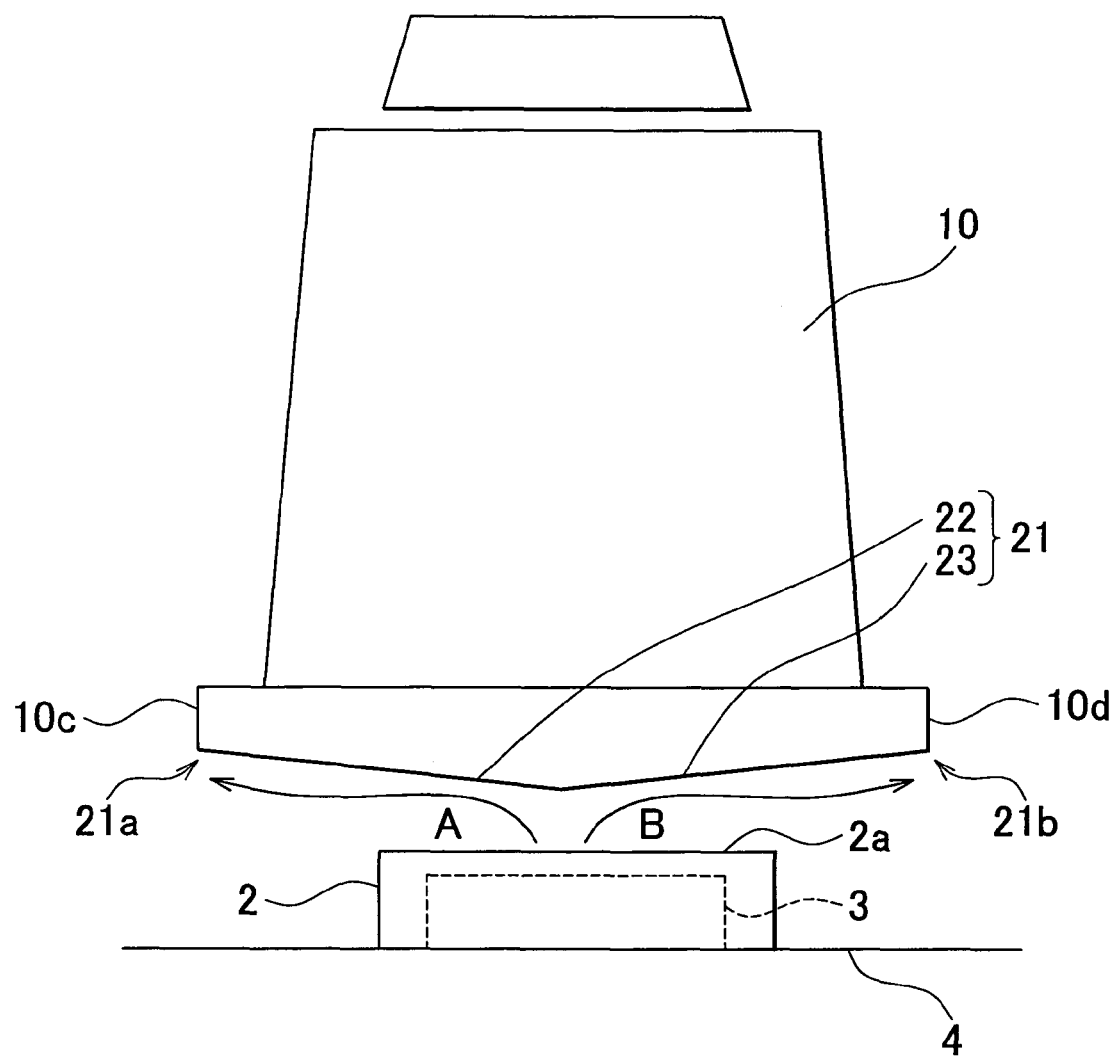
FIG. 8 is a schematic view that depicts a second modification of the heat radiation mechanism according to the second embodiment.

A second modification of this embodiment is next described with reference to FIG. 8. FIG. 8 is a schematic view illustrating a heat radiation mechanism of this modification and corresponding to FIG. 6 of the embodiment described above. Members having the same function as the members described with reference to FIG. 1 and FIG. 6 are designated by the same reference numerals and symbols.

The differences from the embodiment of FIG. 6 described above are mainly described as follows.

The guide surface 21 forming the bottom face of the seat 10 is formed of two generally flat surfaces (first and second guide surfaces 22 and 23).

The first guide surface 22 is formed such that the distance from the upper surface 2a of the battery pack 2 gradually decreases from the left end 21a of the guide surface 21 to the right end 21b of the guide surface 21 as in the embodiment described before. In other words, the first guide surface 22 is inclined, so that the first guide surface 22 somewhat faces the left of the seat 10. That is, the first guide surface 22 is inclined with respect to the upper surface 2a of the battery pack 2 or the vertical direction of the seat 10.

The second guide surface 23 is formed such that the distance between the upper surface 2a of the battery pack 2 and the second guide surface 23 gradually decreases from the right end 21b of the guide surface 21 to the left end 21a of the guide surface 21 as in the first modification described above. In other words, the second guide surface 23 is inclined, so that the second guide surface 23 somewhat faces the right of the seat 10. That is, the second guide surface 23 is inclined with respect to the upper surface 2a of the battery pack 2 or the vertical direction of the seat 10.

The guide surface 21 is closest to the battery pack 2 (upper surface 2a) at the joint between the first and second guide surfaces 22 and 23. The joint between the first and second guide surfaces 22 and 23, which is separated from the upper surface 2a of the battery pack 2 in this modification, may be in contact with the upper surface 2a of the battery pack 2.

According to this modification, the heat from the battery pack 2 is transferred along the first and second guide surfaces 22 and 23 to spaces on the right and left sides of the seat 10 as indicated by arrows A and B of FIG. 8. Therefore, the heat from the battery pack 2 is prevented from accumulating in the space under the seat 10, and the thermal radiation efficiency of the battery pack 2 is improved.

While a case where the guide surface 21 is formed on the entire bottom face of the seat 10 is described in the embodiment and modifications described above, the invention is not limited thereto. For example, the guide surface may be formed on at least a part of the bottom face of the seat 10 to direct the heat from the battery pack 2 to at least one of the spaces on the right and left sides of the seat 10.

More specifically, when the battery pack 2 is offset to the left under the seat 10, the guide surface may be formed on the left portion of the bottom face of the seat 10. Accordingly, the right portion of the bottom face of the seat 10 may be formed as a surface generally parallel to the upper surface 2a of the battery pack 2. The configuration shown in FIG. 5A and FIG. 5B may be applied to the configurations of this embodiment and this modification.

While the guide surface 21 is formed of at least one flat surface in the embodiment and modifications described above, the invention is not limited thereto.

For example, the guide surface 21 may be formed of at least one curved surface. More specifically, in the configuration shown in FIG. 6, the guide surface 21 may be formed of a curved surface convex toward the battery pack 2. The curved surface has a curvature in the transverse direction of the seat (horizontal direction of FIG. 6) but not in the longitudinal direction of the seat (the direction perpendicular to the plane of FIG. 6).

Similarly, the guide surface 21 may be formed of a curved surface or surfaces convex toward the battery pack 2 in the configuration shown in FIG. 7 or FIG. 8.

The guide surface 21 may be formed of at least one curved surface concave with respect to the battery pack 2. Because the heat from the battery pack 2 cannot be directed in horizontal direction from under the seat 10 efficiently when the guide surface 21 is formed of a curved surface or surfaces with a too large curvature, the curvature must be set properly so that the heat may be radiated from the space under the seat 10 efficiently.

The guide surface 21 may be formed by a combination of a curved surface and a flat surface. Also in this case, it is necessary that the heat from the battery pack 2 is directed to at least one of the spaces on the right and left of the seat 10.

Figure 9A:
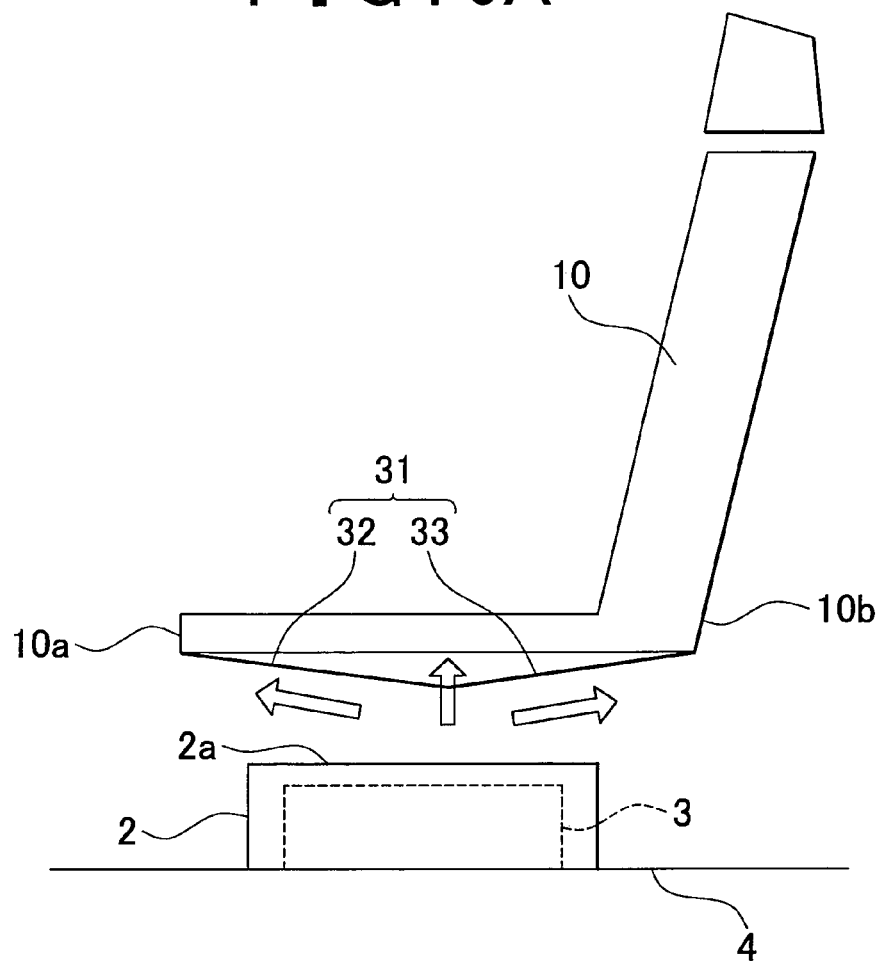
FIG. 9A and FIG. 9B are schematic views that depict heat radiation mechanisms according to a third embodiment of the invention.
Figure 9B:
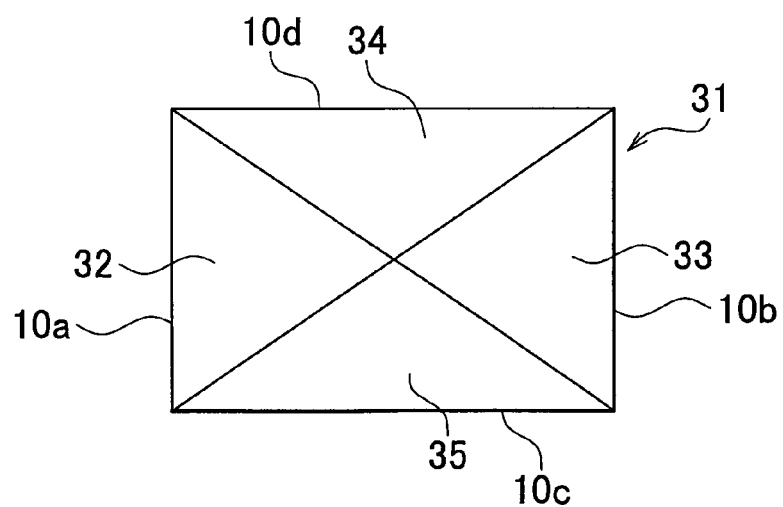
Figure 10:
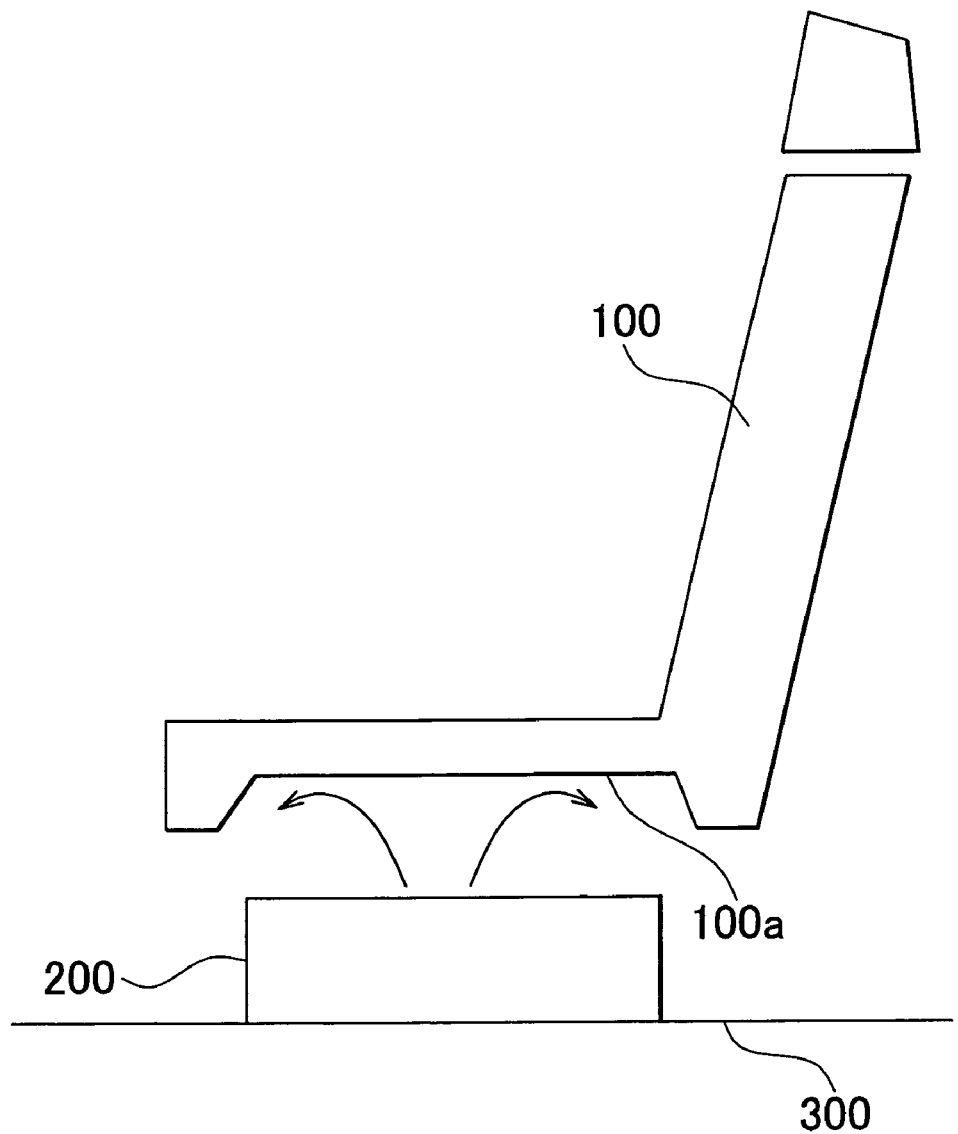
FIG. 10 is schematic view of a conventional configuration in which a battery pack is located under a seat.

A heat radiation mechanism as a third embodiment of the invention is next described with reference to FIG. 9A and FIG. 9B. FIG. 9A and FIG. 9B are views that depict the heat radiation mechanism of this embodiment. FIG. 9A is a schematic view of the heat radiation mechanism, and FIG. 9B is a view of a guide surface seen from the side of the battery pack. The same members as those described in the first embodiment are designated by the same reference numerals and symbols.

Although the heat radiation mechanisms described in the first embodiment and second embodiment direct the heat from the battery pack 2 to at least one of the spaces in front of and behind or on the right and left side of the seat, the heat radiation mechanism of this embodiment directs the heat from the battery pack 2 to spaces on the front, rear, right and left sides of the seat 10. The details are described below.

A guide surface 31 that forms the bottom face of the seat 10 is formed of four generally flat surfaces (first to fourth guide surfaces 32 to 35). More specifically, the guide surface 31 has four guide surfaces 32 to 35 divided by boundary lines extending from the center of the bottom face of the seat 10 to the corners thereof as shown in FIG. 9B. Each of the guide surfaces 32 to 35 has a generally triangular shape.

The first guide surface 32 is inclined with respect to the upper surface 2a of the battery pack 2 and the first guide surface 32 somewhat faces the front of the seat 10 so that it may direct the heat from the battery pack 2 to the front of the seat 10. The second guide surface 33 is inclined with respect to the upper surface 2*a* of the battery pack 2 and the second guide surface 33 somewhat faces the rear of the seat 10 so that it may direct the heat from the battery pack 2 to the rear of the seat 10.

The third guide surface 34 is inclined with respect to the upper surface 2*a* of the battery pack 2 and the third guide surface 34 somewhat faces the right of the seat 10 so that it can direct the heat from the battery pack 2 to the right side of the seat 10. The fourth guide surface 35 is inclined with respect to the upper surface 2*a* of the battery pack 2 and the fourth guide surface 35 somewhat faces the left of the seat 10 so that it can direct the heat from the battery pack 2 to the left side of the seat 10.

The block arrows shown in FIG. 9A indicate the directions in which the heat from the battery pack 2 is transferred.

In the configuration of this embodiment, the heat from the battery pack 2 is directed to the spaces around (spaces on the front, rear, right and left sides of) the seat 10, and thermal radiation efficiency of the battery pack 2 is improved.

Although the guide surface 31 is consisted of four flat surfaces 32 to 35 in this embodiment, the invention is not limited thereto. The guide surface 31 may be formed of curved surfaces or a combination of curved surfaces and flat surfaces. Also in this case, it is necessary to from the battery pack 2 to direct the heat to the spaces around the seat 10.

When curved surfaces are used, the curved surfaces may be convex toward the battery pack 2 or concave with respect to the battery pack 2.

While the guide surface 31 is constituted of four surfaces 32 to 35 in this embodiment, the number of the surfaces may be set as appropriate. Also, while the guide surface 31 is formed on the entire bottom face of the seat 10, the guide surface 31 may be smaller in size than the bottom face of the seat 10.

The guide surface 31 may be formed in the shape of a cone or a polygonal pyramid, for example, a trigonal pyramid or a square pyramid. Also, the guide surface 31 may be formed of a curved surface having curvatures both in the longitudinal and transverse directions of the seat 10. More specifically, the guide surface 31 may be formed in the shape that lies on the surface of a sphere or a part of a sphere deformed into an oval shape and having an ellipsoidal or circular cross-section.

In the first to third embodiments described above, fins or the like may be formed on the guide surface 11 so that the heat from the battery pack 2 is efficiently radiated from the space under the seat 10. More specifically, a fin 40 or a plurality of fins 40 may be formed along the path through which the heat is transferred on the guide surface, as shown in FIG. 11. When a plurality of fins is provided, the fins may be arranged at regular or irregular intervals.

A heat insulating layer may be provided on the guide surface. In this case, because the guide surface is prevented from absorbing the heat from the battery pack 2, the guide surface does not heat the battery pack 2 is prevented from being heated by using the heat that would have been absorbed from the battery pack 2.

The member for forming the guide surface may be made of a material having a large heat capacity. In this case, because the guide surface absorbs the heat from the battery pack 2, the temperature of the air to be discharged outside the seat through the guide surface may be decreased. As a result, it is possible to prevent discomfort caused by the heat to the passenger seated on the seat.

Although the guide surface 11 etc. is formed integrally with the seat 10 in the first to the third embodiments, invention the guide surface 11 etc. may be formed separately from the seat 10. More specifically, a guide member that includes the guide surface 11 etc. may be fashioned separately and attached to a seat.

A method of attaching the guide member is selected as appropriate. For example, the guide member may be attached with an adhesive, screws or the like. A support for slidably supporting the guide member may be formed on the seat so that the guide member is removably attached to the support by sliding engagement.

The guide member at least includes a guide surface, and the shape of the guide member other than the guide surface is set as appropriate. For example, the guide member other than the guide surface may be formed in a shape that is easily attached to the seat.

Although the battery pack 2 is disposed in the space under the seat 10 in the first to third embodiments, invention the battery pack 2 may be provided in other suitable lavations in the passenger compartment. That is, the invention is applicable to a case where the battery pack 2 is disposed under a component other than the seat 10 among the components provided in the passenger compartment.

That is, when there is a space under a component other than the seat 10 and when the battery pack 2 is disposed in the space under the component, the guide surface may be formed to direct the heat from the battery pack 2 outside the space under the component.

An example of a component other than the seat 10 is a console located between seats.

The heat radiation mechanisms according to the first to third embodiments may be selectively used depending on the position where the battery pack 2 is disposed in the passenger compartment.

For example, when the battery pack 2 is disposed below the driver's seat or the passenger's seat, any of the first to third embodiments may be applied. When the battery pack 2 is disposed under a rear seat and when there is a partition behind the rear seat, a heat radiation mechanism other than the heat radiation mechanism shown in FIG. 2 is preferred.

When a space is formed behind the rear seat, the heat radiation mechanism shown in FIG. 2 may be also used.

When battery packs are disposed below each rear seat in a vehicle having three rear seats, the heat radiation mechanisms described in the second embodiment (see FIG. 6 and FIG. 7) may be used for the two rear seats on the door sides. More specifically, the guide surfaces are directed to the doors. As for the center rear seat, the heat from the battery pack 2 may be directed to the front of the seat by the heat radiation mechanism described in the first embodiment (see FIG. 3).

In this configuration, the heat from the battery packs 2 located under the rear seats is efficiently radiated.

In addition, when the heat radiation mechanism described in the third embodiment is used, the heat from the battery pack may be directed to spaces around a seat (spaces in the passenger compartment) regardless of the position of the seat in the passenger compartment. As a result, the heat from the battery pack 2 is prevented from accumulating in the space under the seat.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various example combinations and configurations other combinations and configurations, including more, less or only a single element, are also within the spirit and scope of the invention.

The invention claimed is:

1. A heat radiation mechanism that radiates heat from an electrical storage device disposed in a space under a seat mounted in a passenger compartment of a vehicle, comprising:
   a guide portion having a guide surface, which directs the heat from the electrical storage device out of the space, located between the seat and the electrical storage device,
   wherein the guide surface faces the electrical storage device and is inclined with respect to a horizontal direction from an end portion of the guide surface that is farthest from the electrical storage device in the vertical direction of the seat towards the electrical storage device in the vertical direction, and the end portion is located in the vicinity of left and right faces of the seat, and
   wherein the guide surface is inclined toward at least one of the right and left of the seat.

2. The heat radiation mechanism according to claim 1, wherein the guide surface is formed in the shape of a cone or a polygonal pyramid.

3. The heat radiation mechanism according to claim 1, wherein the guide surface is formed of at least one of a flat surface and a curved surface.

4. The heat radiation mechanism according to claim 3, wherein the curved surface is convex at least one of upward and downward with respect to the vertical direction of the seat.

5. The heat radiation mechanism according to claim 1, wherein the guide surface is formed on the entire bottom face of the seat or a part of the seat.

6. The heat radiation mechanism according to claim 1, wherein a surface of the guide portion on the side of the electrical storage device has a heat-insulating layer.

7. The heat radiation mechanism according to claim 1, wherein the guide surface is made of a material having a high heat absorbing capacity.

8. The heat radiation mechanism according to claim 1, wherein the guide portion is formed integrally with the seat.

9. The heat radiation mechanism according to claim 1, wherein the guide portion is formed separately from the seat.

10. The heat radiation mechanism according to claim 1, wherein the guide portion has a fin arranged along the path through which the heat is transferred on the guide surface.

11. The heat radiation mechanism according to claim 1, wherein the end portion is located in a same plane as the outer face that extends in the vertical direction from an outer periphery of a bottom face of the seat.

* * * * *